Oct. 31, 1961     A. WEISHAUS     3,006,122
HEAT SEALING APPARATUS AND METHOD
Filed April 6, 1960     3 Sheets-Sheet 1
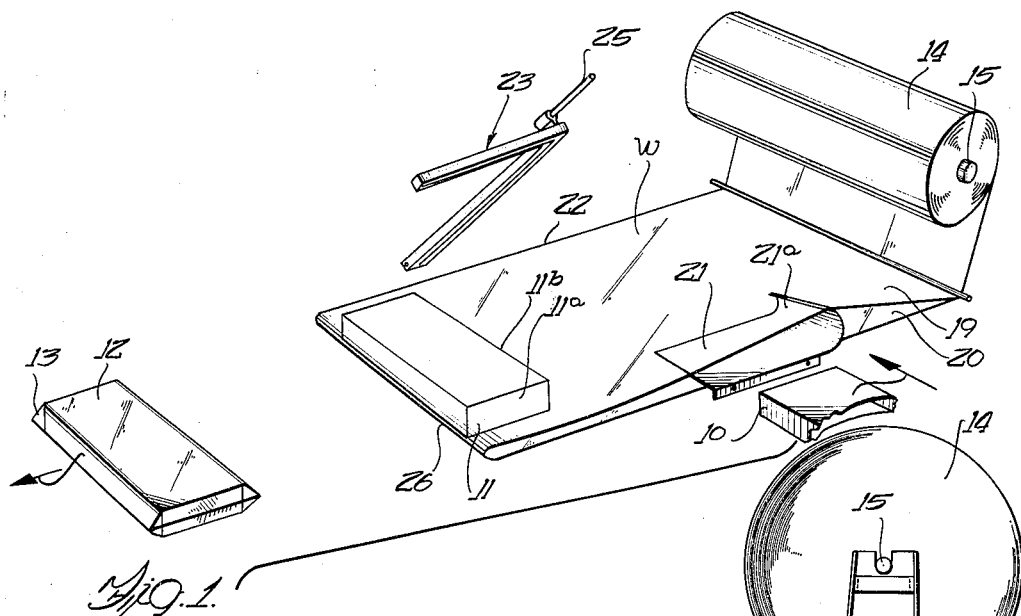
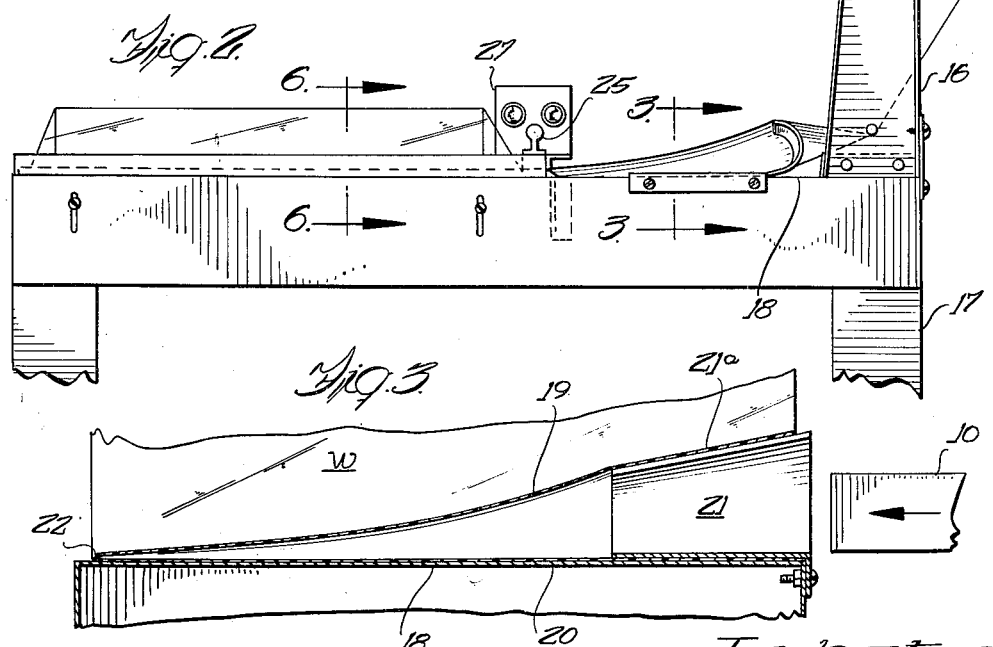
Inventor
Albert Weishaus
Dawson, Tilton, Fallon & Lungmus
Attorneys Oct. 31, 1961 A. WEISHAUS 3,006,122
HEAT SEALING APPARATUS AND METHOD
Filed April 6, 1960 3 Sheets-Sheet 2

Inventor
Albert Weishaus
Dawson, Tilton, Fallon & Lungmus
Attorneys

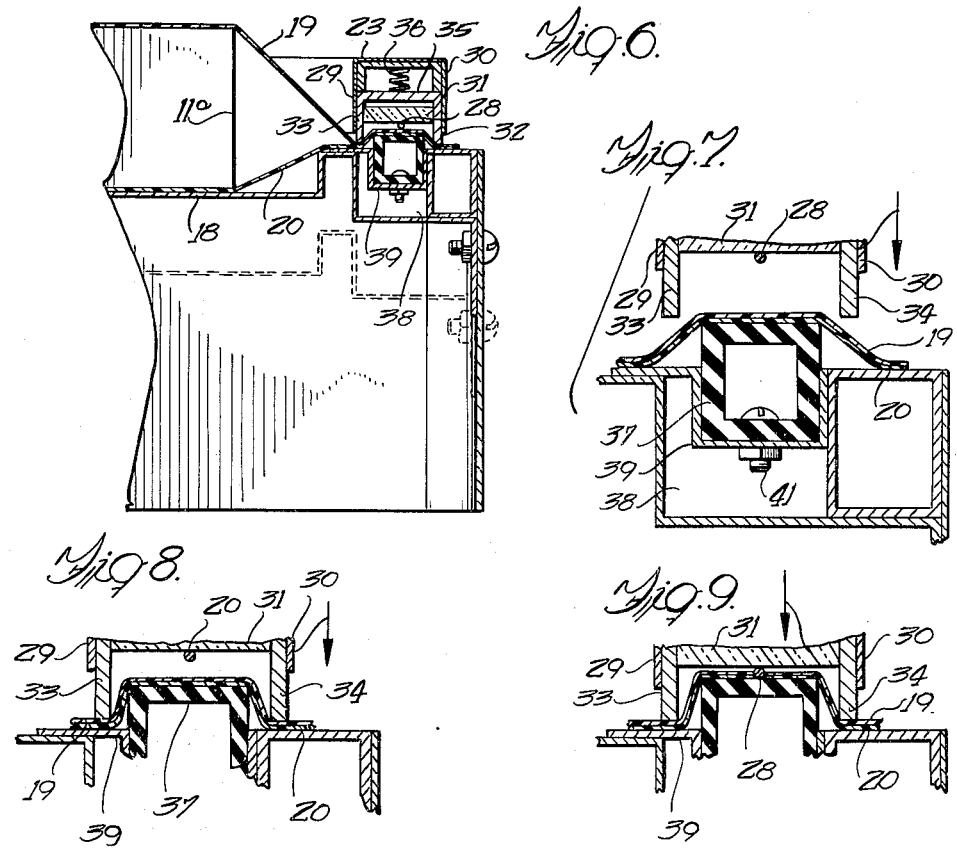

United States Patent Office 3,006,122
Patented Oct. 31, 1961

3,006,122
HEAT SEALING APPARATUS AND METHOD
Albert Weishaus, 140 W. 54th St., Chicago 7, Ill.
Filed Apr. 6, 1960, Ser. No. 20,439
9 Claims. (Cl. 53—182)

This invention relates to heat sealing apparatus and method, and, more particularly, to the heat sealing of two webs of thermoplastic material when the same are provided in superposed relation and united along one common longitudinal edge.

It is a general object of this invention to provide a novel apparatus and method for the heat sealing of superposed webs particularly adapted for rapid manual operation.

Another object is to provide a device suitable for uniting plastic webs in which two intersecting sides of an object to be wrapped are simultaneously enclosed in the wrapping material.

Still another object is to provide an apparatus and method for wrapping in heat-sealable material, an article adapted to fit a generally rectangular package, and in which the package is completed along two adjacent sides simultaneously by a compression step in the presence of heat, the compression step initially serving to position and stabilize the article being wrapped.

Yet another object is to provide novel apparatus employable in the art of heat sealing in which the heat sealing element is equipped with retractable means serving to immobilize and stabilize the webs, or the like, being united by heat sealing.

Other objects and advantages of this invention may be seen in the details of construction and operation set forth herein.

The invention will be explained in conjunction with an illustrative embodiment in the accompanying drawing, in which—

FIG. 1 is a fragmentary perspective view of apparatus embodying teachings of this invention and which illustrates the inventive steps thereof;

FIG. 2 is a fragmentary elevational view of apparatus employed in the practice of the instant invention;

FIG. 3 is an enlarged fragmentary sectional view of the apparatus of FIG. 2 and as would be derived from a view taken from along the line 3—3 of FIG. 2;

FIG. 6 is a fragmentary cross-sectional view taken along the line 6—6 of FIG. 2;

FIG. 7 is an enlarged sectional view of a fragment of the apparatus seen in FIG. 6 and with the elements thereof shown in a different operative condition;

FIG. 8 is a view similar to FIG. 7 but illustrating the parts in a different operative position; and FIG. 9 is a view similar to FIGS. 7 and 8 but which features the elements in yet another operative condition—the condition of FIG. 9 being that illustrated in FIG. 6.

Figure 4:
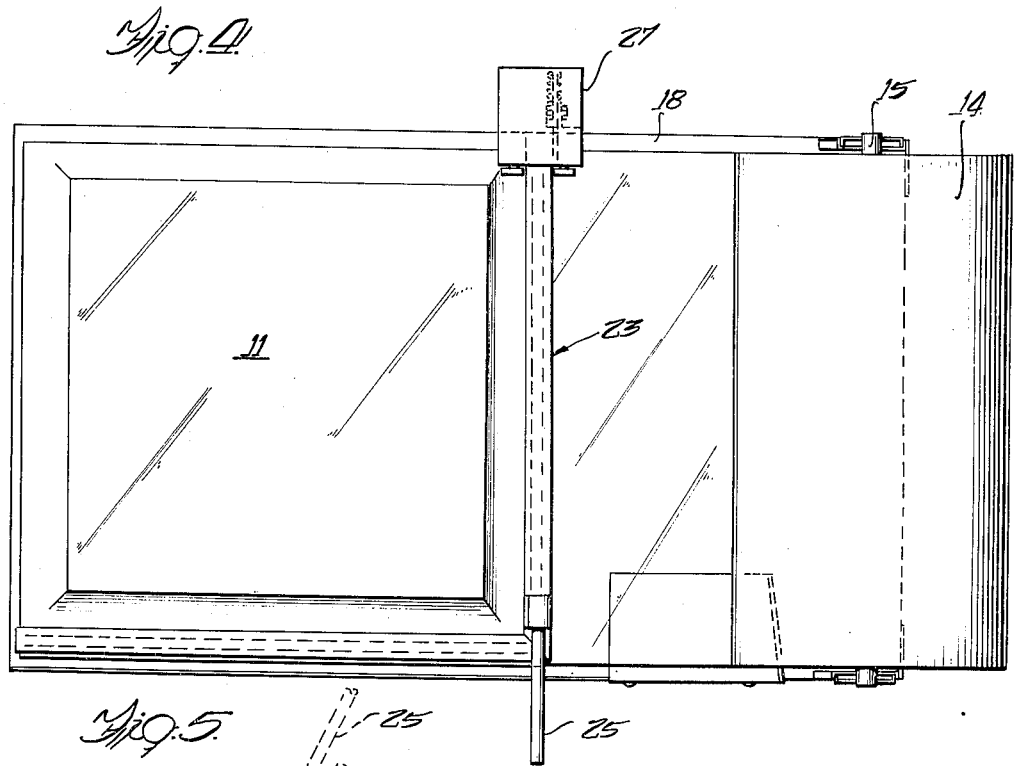
FIG. 4 is a top plan view of the apparatus seen in FIG. 2.

In the illustration given, and with particular reference to FIG. 1, the numeral 10 designates a fragment of an article to be wrapped, while the numeral 11 designates another article (similar to article 10) in a stage of being wrapped, and the numeral 12 designates yet another article—this article being seen in a wrapped condition, the wrapping being designated 13.

Providing the wrapping material 13 is a roll 14 which is supported upon a shaft 15. The shaft 15, as can be seen from FIG. 2, is supported on a back stand 16 in conventional fashion, the back stand 16 being provided as part of a frame 17. The frame 17 is equipped with an upper surface or platform which provides a table 18.

The roll 14 is wound with a two-ply web W, the two plies 19 and 20 being designated in FIG. 1 at the point they are just separated under the influence of a guide member 21. The two plies making up the web W can also be seen by reference to FIG. 6. The web W has the two plies 19, 20 united along one longitudinal edge as at 22 in FIG. 1—this being conveniently achieved by folding the web W on itself prior to being wrapped around the shaft 15. The numeral 23 in FIG. 1 designates generally a heat sealing element which, from a consideration of FIG. 5, can be seen to be pivotally mounted as at 24 to the platform-providing frame 17. The heat sealing element 23 is L-shaped and is equipped with a projecting handle 25.

After an article has been packaged, such as the article 12 in the wrapping 13 of FIG. 1, there remains a transverse seal 26 at the extreme leading edge of the web W. When the next article to be wrapped (11 in the illustration given) has been inserted between the plies 19 and 20, pivotal downward movement of the arm 23 urges the package 11 against the previously provided side union and at the same time effects a seal along the sides 11a and 11b of the package.

For the purpose of providing the heat necessary for the heat sealing operation, the arm 23 is provided with an electrical connection box 27 which serves to energize an electrical resistance element 28 (see FIGS. 6–9). In the illustration given, the element 28 is a wire, and the contact of the wire 28 with the plies 19 and 20 (as in FIG. 9) serves to develop two closely spaced transverse seals within a line of incipient severance or weakness therebetween. Thus, the package 13 can be readily detached from the remainder of the web W while the leading edge of the web W remains closed by virtue of the previous sealing operation. This has proven particularly effective with polyethylene as the web W.

The heat sealing element or arm 23 is seen to be essentially channel-shaped (see FIGS. 6–9), with the legs of the channel shape facing downwardly, i.e., towards the table 18. Supported between the legs 29 and 30 of the arm 23 is an insulating strip 31. Also supported between the depending legs 29 and 30 is a channel-shaped member 32 which includes integral legs 33 and 34. The connecting portion 35 of the member 32 (seen only in FIG. 6) is urged downwardly from the arm 23 by virtue of a coiled spring 36 interposed between the arm 23 and the connecting portion 35. For the purpose of accomplishing the reciprocation of the member 32 within the arm 23 (the reciprocation being shown in stages in FIGS. 7–9), the legs 32 and 33 may be slotted at spaced-apart intervals to accommodate the spaced supports for the insulating element 31.

As the arm 23 is brought downwardly toward the table 18, the condition of the equipment seen in FIG. 7 exists shortly before contact of the legs 33 and 34 with the plies 19 and 20. Shortly thereafter, the legs 33 and 34 contact the top ply 19, pressing it tightly against the ply 20, but while the electrical element 28 is still spaced above the now tightly superimposed plies 19 and 20, the tight superposition is achieved by virtue of the legs 33 and 34 effectively stretching the plies 19 and 20 across the protruding resilient element 37 (this seen clearly in FIG. 8). Finally, the condition of apparatus seen in FIG. 9 is achieved where the legs 33 and 34 have been retracted within the legs 29 and 30 to the extent that the element 28 now contacts the top ply 19 so as to fuse portions of the same to the ply 20.

The table 18 is equipped with a recess 38 (see FIGS. 6 and 7) which is achieved by forming the metal making up the table 18. Mounted within the formed portions of the table 18 and supported within the recess 38 is a supporting member 39. The member 39 is also recessed as at 40 and within the recess 40 is mounted the tubular resilient member 37, being secured therein by means of a nut and bolt 41 (designated only in FIG. 7). The resilient element 37 protrudes somewhat above the member 39 so that a definite tensioning of the plies 19 and 20 is achieved when the spaced-apart legs or flanges 33 and 34 engage the same as in FIGS. 8 and 9.

The recess 40 and the element 37 are semi-perimetric relative to the package 11 and conform in shape to the L-shaped element 23.

The guide element 21 is seen to have a curved edge as at 21a (see FIG. 1), which facilitates separating of the plies 19 and 20, the leading edge 21a being inwardly tapered, as can be appreciated from a consideration of FIG. 3.

Figure 5:
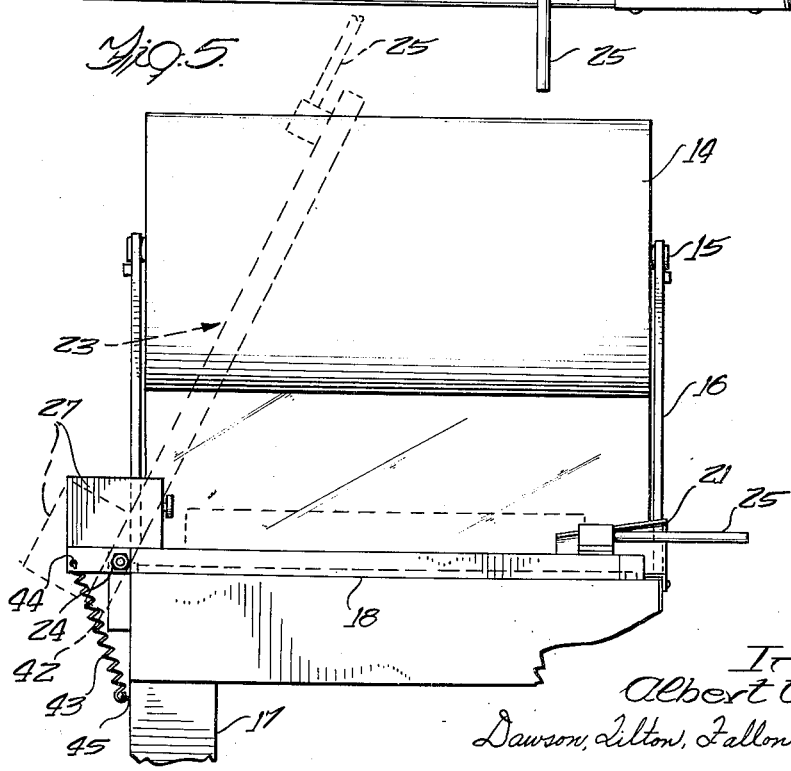
FIG. 5 is a fragmentary end elevational view of the apparatus seen in FIGS. 2 and 4.

The arm 23 is extended slightly beyond its pivot point 24 as at 42 in FIG. 5 to provide a support for the housing 27. The housing 27 is thus supported equally about the pivot point 24 and thus does not interfere with the easy manipulation of the arm 23. The arm 23 is effectively urged to the position seen in FIG. 5 by means of a spring 43 which is interconnected between the housing 27 as at 44 and the frame 17 as at 45.

While, in the foregoing specification, a detailed description of the invention has been set forth for the purpose of illustration thereof, many variations in the details herein given may be made without departing from the spirit of the invention.

I claim:

1. In package sealing apparatus, and the like, a frame, means for feeding a double web on said frame, means on said frame in the path of travel of said web for inserting a package between the plies thereof, and a sealing member movably mounted on said frame in the path of web travel, said member being L-shaped and adapted to seal said plies together adjacent the trailing edge of the package positioned therein, said member being equipped with a pair of elongated dependent flange portions adapted to urge said web against said frame, said frame being equipped with a raised portion in the path of web travel, said raised portion being adapted to be straddled by said flange portions.

2. The structure of claim 1 in which said flange portions are resiliently, reciprocably mounted in said member.

3. The structure of claim 1 in which said inserting means includes a curved tapered guide member.

4. In a packaging machine, a platform for supporting an article to be packaged between webs of heat-sealable material, an elongated heat sealing arm pivotably secured to said platform for movement into a position in parallel, abutting relation therewith, said arm being equipped with a longitudinally-extending electrical element on the side thereof adapted to abut said platform, and a pair of longitudinally-extending members in said arm reciprocably mounted therein and arranged on opposite sides of said element, said members being retractable into said arm upon engagement with said platform to expose said element, said platform being equipped with a raised portion aligned with said arm and sized to be included between said members.

5. The structure of claim 4 in which said members are equipped with means resiliently urging said members out of said arm.

6. The structure of claim 4 in which said portion is a resilient tube, said platform being equipped with a recess partially housing said tube.

7. In heat sealing apparatus adapted to unite superposed webs of heat-sealable plastic material, a table equipped with communicating transverse and longitudinal recesses, a resilient member in each recess protruding above the table surface, an L-shaped arm pivotally secured to said table and adapted to be moved into covering relation with said recesses, said arm being equipped on the surface adjacent said table with an electrical conduit, and means for electrically heating said conduit, said arm being equipped with a pair of spaced-apart, depending, parallel flanges, one on either side of said conduit, means in said arm resiliently urging said flanges away from said arm, said flanges being retractable into said arm against the urging of said urging means to permit said conduit to contact said webs when the same overlie said resilient members.

8. The structure of claim 7 in which said arm is equipped with a pair of spaced-apart, depending, parallel flanges, one on either side of said conduit, means in said arm resiliently urging said flanges away from said arm, said flanges being retractable into said arm against the urging of said urging means to permit said conduit to contact said webs when the same overlie said resilient members.

9. In heat-sealing apparatus for enclosing an article between two webs of thermoplastic material, a frame providing a generally rectangular platform on the top surface thereof, means on said frame for supporting a web roll adjacent one end of said platform, an arm pivotally mounted on said platform adjacent one side thereof and for movement through a vertical arc downwardly toward said platform, guide means on said platform adjacent the other side thereof and positioned between said arm and roll-supporting means, said platform being equipped with a recess aligned with said arm, a resilient member in said recess projecting above the platform surface, the lower surface of said arm being equipped with a resistance wire, means on said platform for electrically heating said wire, and a pair of retractable members on said arm on opposite sides of said wire for initially contacting webs positioned on said table and on opposite sides of said resilient member.

References Cited in the file of this patent

UNITED STATES PATENTS

| | | |
|---|---|---|
| 2,627,213 | Nye | Feb. 13, 1953 |
| 2,919,530 | Garson et al. | Jan. 5, 1960 |

Notice of Adverse Decision in Interference

In Interference No. 94,272 involving Patent No. 3,006,122, A. Weishaus, Heat sealing apparatus and method, final judgment adverse to the patentee was rendered Dec. 1, 1964, as to claim 4.

[*Official Gazette January 19, 1965.*]